United States Patent [19]

Zankl

[11] Patent Number: 4,479,675
[45] Date of Patent: Oct. 30, 1984

[54] LID ARRANGEMENT FOR LUGGAGE COMPARTMENT

[75] Inventor: Kurt O. Zankl, Nauheim, Fed. Rep. of Germany

[73] Assignee: General Motors Corporation, Detroit, Mich.

[21] Appl. No.: 459,473

[22] Filed: Jan. 20, 1983

[30] Foreign Application Priority Data

Feb. 5, 1982 [DE] Fed. Rep. of Germany ....... 3203940

[51] Int. Cl.³ .............................................. B60R 3/08
[52] U.S. Cl. .................... 296/37.16; 296/76; 16/324; 292/175; 292/DIG. 72
[58] Field of Search ............... 296/37.1, 37.8, 37.16, 296/76; 16/231-232, 324, 326-327, 349; 292/32, 42, 163, 175, DIG. 72

[56] References Cited

U.S. PATENT DOCUMENTS

| 600,318 | 3/1898 | Pletcher | 16/232 |
| 2,311,965 | 2/1943 | Reynolds | 16/326 |
| 2,620,889 | 12/1952 | McCormick | 16/232 X |
| 3,743,335 | 7/1973 | Reilhac et al. | 292/DIG. 72 |
| 4,073,534 | 2/1978 | Hira | 296/37.16 |
| 4,168,094 | 9/1979 | Yagi | 296/37.16 |
| 4,277,097 | 7/1981 | Lalanne | 296/37.16 |
| 4,351,555 | 9/1982 | Hashimoto | 296/37.16 |

FOREIGN PATENT DOCUMENTS 0008931 1/1980 Japan ................. 296/37.16

Primary Examiner—Robert B. Reeves
Assistant Examiner—Russell D. Stormer
Attorney, Agent, or Firm—Charles E. Leahy

[57] ABSTRACT

A lid for the luggage compartment of a motor vehicle has a hinge pin with opposed ends supported in upwardly opening sockets mounted on vehicle body. Spring biased latches are carried by the sockets and have lugs projecting over the hinge pin to latch the hinge pin and enable pivotal movement of the lid about a hinge axis defined by the hinge pin. The latches are withdrawn to unlatching positions by handles integral with the latches. Springs carried by the sockets lift the end of the hinge pin out of the socket so that the ends of the hinge pin engage with the lugs to hold the latches in the unlatched position to enable subsequent pivotal movement of the lid about a second hinge pin provided at the other end of the lid.

3 Claims, 7 Drawing Figures

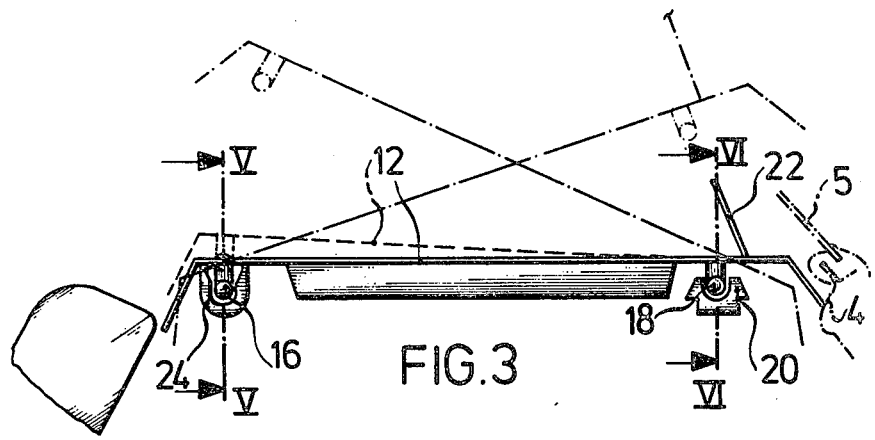
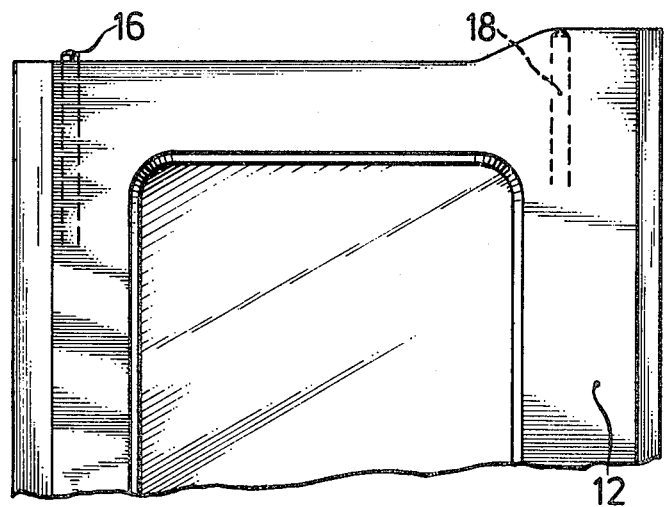
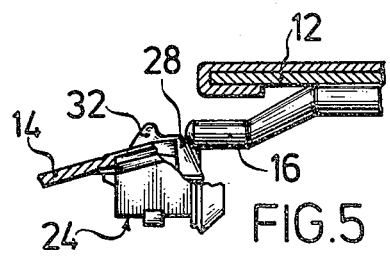 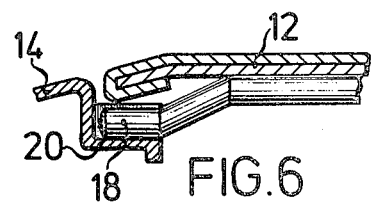

LID ARRANGEMENT FOR LUGGAGE COMPARTMENT

The invention is directed to a motor vehicle having a tailgate and a luggage compartment lid extending from the tailgate to the backrest of the rear seat, and being supported near its forward and rearward ends by way of hinge means or the like in a manner so as to permit the panel to be lifted from the rear of the vehicle as well as from the occupant compartment.

BACKGROUND OF THE INVENTION

A luggage compartment lid of this type has been disclosed in U.S. Pat. No. 4,073,534 issued Feb. 14, 1978 to Kazumi Hira. In this type of arrangement, the rearward end of the luggage compartment lid is usually connected with the tailgate by means of two laterally disposed strings. Thus, upon opening of the tailgate, the luggage compartment lid is also lifted up at its rearward end, so as to make the luggage compartment accessible. The forwardly disposed hinge pins of the luggage compartment lid are either loosely supported in U-shaped sockets, or the U-shaped sockets have lateral resilient legs, whose upper portion have a gap that is smaller than the diameter of the hinge pin. Thus, the hinge pins are mounted in their respective sockets in such a manner that they can be lifted out therefrom by applying a relatively low measure of force.

In spite of this type of hinge arrangement, in which the hinge pins may be lifted out of their sockets when a predetermined force is being applied, it may happen that, as the tailgate is opened and lifted upwardly, the luggage compartment lid is not only lifted out of its rearward sockets, but that the hinge pins are also lifted out of their forwardly disposed sockets. This problem is particularly apparent when the tailgate is allowed to be lifted up relatively high and the luggage compartment lid is relatively short in the lengthwise direction of the vehicle. As a consequence of the forward hinge pins being lifted out of their sockets, it may happen that while the luggage compartment lid will return to its horizontal position after the tailgate is closed again, its forward hinge pins will not re-engage with their respective sockets. Thus, the luggage compartment lid will give rise to rattling noises when the vehicle is in motion.

SUMMARY OF THE INVENTION

It is the object of the present invention to eliminate these shortcomings, i.e., to provide a luggage compartment lid which, while being adapted to be lifted up in the usual manner from the rear of the vehicle when the tailgate is being raised, its forward hinges will not be lifted out of their retaining means. Thus, the luggage compartment lid will always return to its proper position after the tailgate is being closed again.

This object is achieved in accordance with the present invention by providing in or near the forwardly disposed hinge means a latch, or the like, which prevents the hinge pins from being lifted up or out of their sockets and which is retained in its latched position by way of a spring. This will prevent the forwardly disposed hinge means from being lifted out of its retaining means when the tailgate is raised up.

As a result, the luggage compartment lid cannot be simply lifted up or swung rearwardly from within the occupant compartment. In order to raise up the luggage compartment lid, the latch must first be moved out of its latching position. To accomplish this in a most advantageous manner, it is further proposed that the latches be disposed longitudinally of the hinge pins for slidable or pivotable movement. Furthermore, each latch is provided with an operating handle.

To facilitate disengagement of the hinges for raising up the luggage compartment lid from within the occupant compartment, a spring is provided in or near each of the hinge means for urging the hinge pin out of the latching position. This will cause the hinge pin, after disengagement of the latching means, to be urged upwardly to a point where it cannot be engaged any more by the latch. The lid can then easily be swung upwardly, i.e., immediately after unlatching of the latching means. The invention will now be described by way of one exemplary embodiment.

DESCRIPTION OF THE DRAWINGS

In the drawings,

FIG. 3 is a side elevation of the luggage compartment lid;

FIG. 4 is a partial plan view of the luggage compartment lid;

FIG. 5 is a sectional view along lines V—V of FIG. 3;

FIG. 6 is a sectional view along lines VI—VI of FIG. 3; and

DESCRIPTION OF THE PREFERRED EMBODIMENT

Figure 1:
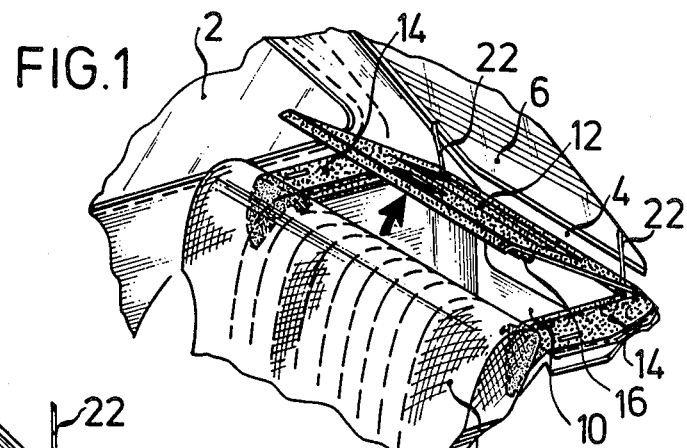
FIG. 1 is a perspective view of the rearward portion of a motor vehicle having a tailgate.
Figure 2:
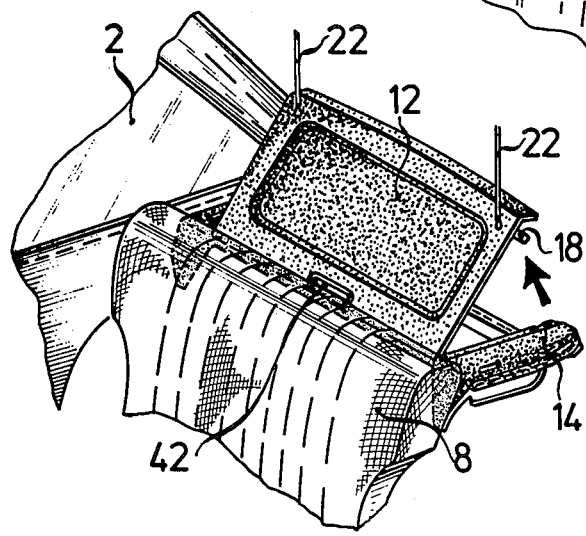
FIG. 2 is the same view showing the luggage compartment lid in a different position.

In FIGS. 1 and 2, the rearwardly disposed side window 2 is being shown, as well as the tailgate 4 which incorporates the rear window 6. A luggage compartment 10 is located between the tailgate 4 and the backrest 8 of the rear seat and is provided with a cover in the form of a lid 12. The lid 12 extends from the tailgate 4 to the backrest 8 of the rear seat. Consoles 14 are arranged on each side of the lid 12, respectively, and are mounted between the lid and the respective sidewalls of the motor vehicle.

The lid 12 is provided with lateral hinge pins 16 and 18, as best seen in FIGS. 3 and 4. The rearwardly disposed hinge pins 18 are engaging with U-shaped sockets 20, when the lid is in its close position. The sockets 20 are secured to the consoles 14. In the area of the hinge pins 18, i.e., at the rearward end of lid 12, strings 22 are attached to the lid 12, and the upper ends of strings 22 are connected with the tailgate 4. Thus, when the tailgate 4 is opened, lid 12 is lifted upwardly and is pivoting about its forwardly disposed hinge pins 16 as illustrated in FIG. 2.

Figure 7:
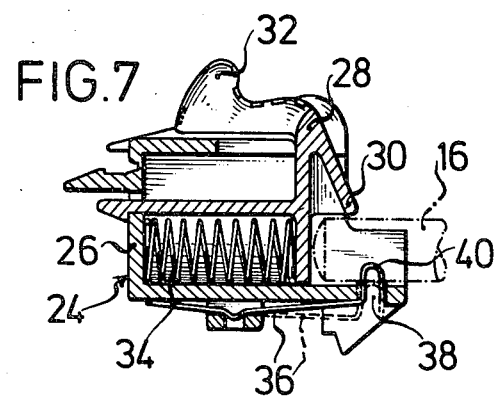
FIG. 7 is a sectional view of the forwardly disposed hinge means.

As best seen in FIGS. 3 and 7, the forwardly disposed hinge pins 16 are mounted in retainer sockets 24. Unlike the rearwardly disposed sockets 20, retainer sockets 24 are not in the form of simple U-shaped sockets. Each retainer socket 24 is comprised of a housing 26 which, like the sockets 20, is mounted on the console 14 and forms a U-shaped socket for receiving the hinge pin 16. In addition, the housing 26 carries a sliding member in the form of a latch 28 which has a lug 30 projecting over the hinge pin 16, as illustrated in FIG. 7. The latch 28 is also provided with a handle 32 and is subjected to the force exerted by a latch spring 34. In FIG. 7, the phantom line indicated hinge pin 16 is illustrated in the latched position in which the latch spring 34 urges latch 28 inwardly to cause the lug 30 to project over the hinge pin 16. A spring 36 mounted at the bottom of housing 26 is provided with an upwardly bent portion 40 that extends upwardly through an opening 38 of the housing 26 into the U-shaped socket for the hinge pin 16. As shown in FIG. 7, the upwardly bent portion 40 of spring 36 extending through the opening 38 is pushed downwardly by hinge pin 16 as indicated by the broken lines. The latch 28 retains the hinge pin 16 in the retainer socket 24 as illustrated in FIG. 7, no matter whether the lid is covering up the luggage compartment or whether it is raised up by the tailgate.

If now the luggage compartment is to be made accessible from within the occupant compartment, the latch 28 is to be moved by way of the handle 32 to the left against the bias of spring 34. As soon as the lug 30 of the latch 28 is withdrawn to expose the end of the hinge pin 16, said hinge pin is urged upwardly by the bent portion 40 of spring 36 to a point where its upper edge will assume a position above the lug 30 and the end of the hinge pin 16 holds the latch 28 in the unlatched position, while the lid 12 is still near its closed position. This position is indicated in FIG. 3 by the broken line. Naturally, the latches 28 must be withdrawn on both sides, which should be done simultaneously. Thus, when the lid 12 with its hinge pins 16 assumes a position above the socket and the end of the hinge pins hold the latch 28 in the unlatched position, the lid 12 can be swung open easily with one hand as, for instance, with the help of a handle 42, as is illustrated in FIG. 1. FIG. 5 shows that when the lid 12 is swung downwardly the end of the hinge pin 16 depresses against the angled face of the latch 28 to withdraw the latch 28 so that the hinge pin again depresses the spring 36 and the lug 30 projects of the hinge pin 16. In FIG. 3 the respective positions of the raised lid 12 are indicated by way of example by the phantom lines.

The embodiments of the invention in which an exclusive property or privilege is claimed are defined as follows:

1. A lid arrangement for a motor vehicle body luggage compartment comprising:
   a lid;
   a hinge pin attached to the lid and extending from the edge portion thereof;
   a socket housing attached to the vehicle body and having an upwardly opening socket adapted to receive and support the hinge pin;
   a latch movably carried by the socket housing and having a lug adapted to overlie the hinge pin;
   latch spring means urging the movement of the latch to a latching position in which the lug overlies the hinge pin to retain the hinge pin in the housing socket and enable pivotal movement of the lid about an axis defined by hinge pin;
   said latch spring means being yieldable to enable withdrawal of the latch lug to an unlatching position to permit removal of the hinge pin from the upwardly open socket of the socket housing; and
   second spring means mounted on the socket housing and urging initial upward movement of the hinge pin out of the socket to a position in which the hinge pin holds the latch in the withdrawn unlatching position whereby the lid may be subsequently raised for pivotal movement about a secondary axis spaced from the hinge pin.

2. A lid arrangement for a motor vehicle luggage compartment defined by sidewalls and the seat back and accessible through the tailgate or from the seat comprising:
   a lid having a forward end adjacent the seat and a rearward end adjacent the tailgate;
   a forward hinge pin attached to the forward end of the lid and a rearward hinge pin attached to the rearward end of the lid, said hinge pins extending transversely of the vehicle and having hinge pin ends disposed adjacent the sidewalls of the luggage compartment;
   socket housings attached to the vehicle body luggage compartment sidewalls adjacent each hinge pin end and having upwardly opening sockets adapted to receive the hinge pin ends so that the rearward end of the lid may be pivotally raised about a forward hinge axis defined by the forward hinge pin and the forward end of the lid may be pivotally raised about a rearward hinge axis defined by the rearward hinge pin;
   means connecting the rearward end of the lid with the tailgate to automatically raise and lower the rearward end of the lid upon opening and closing movement of the tailgate; and
   retainer latch means associated with the socket housings supporting the hinge pin ends of the forward hinge pin, said retainer latch means having spring biased latch members slidably mounted on the socket housings for spring biased movement to latching positions overlying the hinge pin ends to retain the hinge pin within the sockets and being manually movable against the spring bias to unlatched positions withdrawn from overlying the hinge pin ends to enable pivotal movement of the forward lid end about the hinge axis defined by the rearward hinge pin.

3. A lid arrangement for a motor vehicle luggage compartment defined by sidewalls and the seat back and accessible through the tailgate or from the seat comprising;
   a lid having a forward end adjacent the seat and a rearward end adjacent the tailgate;
   a forward hinge pin attached to the forward end of the lid and a rearward hinge pin attached to the rearward end of the lid, said hinge pins extending trasversely of the vehicle and having hinge pin ends disposed adjacent the sidewalls of the luggage compartment;
   a forward pair of socket housings attached to the vehicle body adjacent the forward hinge pin ends and a rearward pair of socket housings attached to the vehicle body adjacent the rearward hinge pin ends, said socket housings having upwardly opening sockets adapted to receive the hinge pin ends so that the rearward end of the lid may be pivotally raised about a forward hinge axis defined by the forward hinge pin and the forward end of the lid may be pivotally raised about a rearward hinge axis defined by the rearward hinge pin;
   latch member movably carried by the forward pair of socket housings supporting the forward hinge pin ends and having lugs adapted to overlie the hinge pin ends;
   latch spring means associated with each of the latch members for urging movement to a latching position in which the lug overlies the hinge pin end to retain the hinge pin in the housing socket and enable the rearward end of the lid to be pivotally raised about the forward hinge axis defined by the forward hinge pin;

handle means associated with each of the latch members to enable manual movement of the latch member to an unlatching position withdrawing the lug from overlying engagement of the hinge pin end to permit removal of the hinge pin end from the upwardly opening socket of the socket housing; and second spring means mounted on the socket housing urging initial upward movement of the hinge pin end out of the socket to a position in which the hinge pin end holds the latch in the withdrawn unlatching position whereby the forward end of the lid may be subsequently raised for pivotal movement of the lid about the rearward hinge axis defined by the rearward hinge pin.

* * * * *